US011286382B2

(12) United States Patent
Grismala (10) Patent No.: US 11,286,382 B2
(45) Date of Patent: Mar. 29, 2022

(54) ANAEROBIC PASTE COMPOSITIONS

(71) Applicant: HENKEL IP & HOLDING GMBH, Duesseldorf (DE)

(72) Inventor: Roger J. Grismala, Enfield, CT (US)

(73) Assignee: Henkel AG & Co., KGaA, Dusseldorf (DE)

( * ) Notice: Subject to any disclaimer, the term of this patent is extended or adjusted under 35 U.S.C. 154(b) by 0 days.

(21) Appl. No.: 17/060,675

(22) Filed: Oct. 1, 2020

(65) Prior Publication Data

US 2021/0017376 A1 Jan. 21, 2021

Related U.S. Application Data

(63) Continuation of application No. PCT/US2019/034100, filed on May 28, 2019, which
(Continued)

(51) Int. Cl.
*C08L 33/10* (2006.01)
*C09J 11/06* (2006.01)
(Continued)

(52) U.S. Cl.
CPC ............... *C08L 33/10* (2013.01); *C09J 11/06* (2013.01); *C09J 133/10* (2013.01); *C09K 3/10* (2013.01);
(Continued)

(58) Field of Classification Search
CPC .............. C10M 103/02; C10M 107/04; C10M 107/38; C10M 129/16; C10M 129/72; C10M 145/14; C10M 2201/0413; C10M 2207/283; C10M 2209/084; C10M 2201/041; C10M 2201/061; C10M 2201/062; C10M 2201/081; C10M 2201/103; C10M 2201/105; C10M 2205/022; C10M 2205/024; C10M 2207/06; C10M 2207/125; C10M 2207/285; C10M 2209/102; C10M 2209/103; C10M 2209/105; C10M 2213/062; C10M 2215/042;
(Continued)

(56) References Cited

U.S. PATENT DOCUMENTS 4,287,330 A 9/1981 Rich
4,321,349 A 3/1982 Rich
(Continued)

FOREIGN PATENT DOCUMENTS

WO 9901484 A1 1/1999
WO 2016056560 A1 7/2017

OTHER PUBLICATIONS

Rich, Richard D. "Anaerobic Adhesives," Handbook of Adhesive Technology, ed. Pizza, A and Mittal, K.L., Marcel Dekker, Inc., Chapter 2, 1994, pp. 467-479.

*Primary Examiner* — Pamela H Weiss
(74) *Attorney, Agent, or Firm* — Sun Hee Lehmann; Steven C. Bauman (57) ABSTRACT

Anaerobic paste compositions and uses are disclosed. The anaerobic paste compositions remain stable at room temperature for a prolong time without phase separating, making these compositions particularly well suited for long term storage and exposure to extreme temperatures as anaerobic tubular thread sealants compositions.

14 Claims, 8 Drawing Sheets

Related U.S. Application Data is a continuation of application No. 62/677,412, filed on May 29, 2018.

(51) Int. Cl.

| | |
|---|---|
| *C09J 133/10* | (2006.01) |
| *C09K 3/10* | (2006.01) |
| *F16B 33/00* | (2006.01) |
| *C08K 3/04* | (2006.01) |
| *C08K 3/22* | (2006.01) |
| *C08K 3/36* | (2006.01) |
| *C08K 5/05* | (2006.01) |
| *C08K 5/103* | (2006.01) |

(52) U.S. Cl.
CPC ............ *F16B 33/004* (2013.01); *C08K 3/04* (2013.01); *C08K 3/22* (2013.01); *C08K 3/36* (2013.01); *C08K 5/05* (2013.01); *C08K 5/103* (2013.01); *C08K 2003/2241* (2013.01); *C09K 2200/0625* (2013.01)

(58) Field of Classification Search
CPC ........ C10M 2215/06; C10M 2219/044; C10M 2223/04; C10M 2223/041; C10M 169/048; C10N 2040/34; C10N 2030/02; C10N 2030/10; C10N 2030/06; C09J 4/00; C08F 222/102; C08K 3/22; C08K 3/36; C08K 3/04; C08K 5/05; C08K 5/103; C08L 33/00
See application file for complete search history.

(56) References Cited

U.S. PATENT DOCUMENTS

| | | | |
|---|---|---|---|
| 4,379,062 A | | 4/1983 | Prengaman |
| 5,096,963 A | * | 3/1992 | Blain ................. C09J 4/00 |
| | | | 524/765 |
| 5,431,831 A | | 7/1995 | Vincent |
| 5,605,999 A | | 2/1997 | Chu et al. |
| 5,668,092 A | | 9/1997 | Denton |
| 6,063,742 A | | 5/2000 | Konzman |
| 6,451,927 B1 | | 9/2002 | Haas et al. |
| 6,933,264 B2 | | 8/2005 | Petelot |
| 7,041,747 B1 | | 5/2006 | Attarwala et al. |
| 8,198,345 B2 | * | 6/2012 | Patel ................. C09D 133/066 |
| | | | 523/176 |
| 9,206,377 B1 | | 12/2015 | Warren |
| 2005/0154141 A1 | * | 7/2005 | Attarwala ............. C08F 291/00 |
| | | | 525/242 |
| 2005/0274455 A1 | * | 12/2005 | Extrand ............. B29C 65/4875 |
| | | | 156/272.4 |
| 2014/0162917 A1 | * | 6/2014 | Komiyama .......... C10M 171/06 |
| | | | 508/175 |

* cited by examiner

ANAEROBIC PASTE COMPOSITIONS

FIELD OF THE INVENTION

The present invention relates to anaerobic paste compositions. More particularly the invention relates to anaerobic tubular thread sealant paste compositions having a fast cure profile and long-term stability without phase-separating, making these compositions particularly well suited for long-term storage and exposure to extreme temperatures.

BACKGROUND OF THE INVENTION

Anaerobic adhesives and sealants are used in tubular threads, in fasteners and joints, to prevent loosening from vibration, and to protect the thread from corrosion or rust that can result from moistures. Anaerobic paste compositions remain as paste in the presence of air (oxygen), but as the joints are threaded to remove oxygen, the paste compositions polymerize and form solid resins with excellent sealing properties.

Anaerobic adhesive and sealant compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses and new applications continue to be developed.

Anaerobic paste compositions are heavily filled with rheology modifiers and fillers to provide high viscosity. Over time, however, the rheology modifiers and fillers can separate from the resin, especially when exposed to temperature variations. Separation causes some liquids to pool on the surface of the paste and this can vary the curing rate of the anaerobic paste. Depending on the degree of paste separation, the curing rate becomes unpredictable and can decrease or fail completely.

There is a need in the art for anaerobic paste compositions that maintain a single phase and provide predictable, fast cure profile. The current invention fulfills this need.

BRIEF SUMMARY OF THE INVENTION

The present invention relates to an anaerobic paste composition and articles of manufacture comprising the anaerobic sealant composition.

One aspect of the invention is directed to an anaerobic paste composition comprising an acrylate resin, a plasticizer, a curing agent, and a mixture of rheology modifiers of cetyl alcohol and a plurality of synthetic mica fillers having jagged edges with flattened geometric polyhedron shapes.

In another aspect of the invention, the anaerobic paste composition is substantially free of any naturally-occurring mica fillers.

Another aspect of the invention is directed to an anaerobic tubular thread sealant composition comprising an acrylate, a plasticizer, a curing agent, and a mixture of rheology modifiers of cetyl alcohol and a plurality of synthetic mica fillers having jagged edges with flattened geometric polyhedron shapes. The anaerobic sealant paste composition is substantially free of any naturally-occurring mica fillers.

Articles of manufacture encompassed by the invention include threaded surfaces of joint fastener, including nuts, bolts, rods, pins, collars, studs, pipes, and anchor, and the like.

DETAILED DESCRIPTION OF THE INVENTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, particularly as they relate to polymers, polymer compositions or adhesive compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values. As used herein, approximating language may be applied to modify any quantitative representation that may vary without resulting in a change in the basic function to which it is related. Accordingly, a value modified by a term or terms, such as "about," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11", and "about 1" may mean from 0.9-1.1. Other meanings of "about" may be apparent from the context, such as rounding off, so, for example "about 1" may also mean from 0.5 to 1.4.

The present invention provides curable anaerobic paste compositions. The anaerobic paste compositions remain in a single phase under temperature fluctuations and provide predictable, fast cure profile.

The anaerobic sealant composition comprises an acrylate resin, a plasticizer, a curing agent and a rheology modifier, which is a mixture of cetyl alcohol and a plurality of synthetic mica fillers having jagged edges with flattened geometric polyhedron shapes.

(Meth)acrylate monomers suitable for use as the (meth) acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Suitable (meth)acrylate monomers for use herein include polyfunctional (meth)acrylate monomers, such as, but not limited to, di- or tri-functional (meth)acrylates like polyethylene glycol di(meth)acrylates, tetrahydrofuran(meth)acrylates and di(meth)acrylates, hydroxypropyl(meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone(meth)acrylate moieties ("SiMA"), such as those taught by and claimed in U.S. Pat. No. 5,605,999 (Chu), the disclosure of which is hereby expressly incorporated herein by reference.

Combinations of these (meth)acrylate monomers may also be used.

The (meth)acrylate component should comprise from about 5 to about 55 percent by weight of the composition, such as about 15 to about 35 percent by weight, based on the total weight of the composition.

Recently, additional components have been included in traditional anaerobic curable compositions to alter the physical properties of either the curable compositions or the reaction products thereof.

For instance, one or more of maleimide components, thermal resistance-conferring co-reactants, diluent components reactive at elevated temperature conditions, and mono- or poly-hydroxyalkanes, (see International Patent Publication No. WO 99/01484, the disclosure of which is hereby expressly incorporated herein by reference) may be included to modify the physical property and/or cure profile of the formulation and/or the strength or temperature resistance of the cured adhesive.

When used, the maleimide, co-reactant, reactive diluent, and/or mono- or poly-hydroxyalkanes, may be present in an amount within the range of about 0.01 percent to about 2 percent by weight, based on the total weight of the composition.

Suitable plasticizers for use in the present invention may be chosen from a wide variety of materials, such as phthalate-based, adipate-based plasticizers, including trimelliates, maleates, organophosphates and glycol/polyethers. A particularly suitable plasticizer is tetraethylene glycol dioctanoate.

The plasticizer component should comprise from about 1 to about 40 percent by weight of the composition, such as about 10 to about 20 percent by weight, based on the total weight of the composition.

To balance the properties of the strong adhesion and anti-galling and lubricity, the ratio of the (meth)acrylate monomer component to the plasticizer component should be in the range of about 3:1 to about 6:1.

The anaerobic paste composition further comprises a curing agent. The curing agent may be a free radical polymerization, including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 20 percent by weight, based on the total weight of the composition, with about 1 to about 5 percent by weight being desirable.

The inventive paste compositions also include other conventional components, such as free radical co-accelerators, inhibitors of free radical generation, as well as metal catalysts, such as iron and copper.

Conventional accelerators of free radical polymerization may also be used in conjunction with the inventive anaerobic cure accelerators. Suitable accelerators include saccharine, N, N-diethyl-p-toluidine, N, N-demethyl-p-toluidine. Other suitable co-accelerators are typically of the hydrazine variety (e.g., APH), as disclosed in U.S. Pat. Nos. 4,287,330 and 4,321,349.

Anaerobic cure accelerators may be used in amounts of about 0.1 to about 5 percent by weight, such as about 1 to about 2 percent by weight, based on the total weight of the composition. When used in combination with conventional accelerators (though at lower levels, for such conventional accelerators), the inventive accelerators should be used in amounts of about 0.01 to about 5 percent by weight, such as about 0.02 to about 2 percent by weight.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelators may ordinarily be present in the compositions in an amount from about 0.1 percent by weight to about 5 percent by weight, based on the total weight of the composition.

The anaerobic paste further includes a mixture of rheology modifiers of cetyl alcohol and a plurality of synthetic mica fillers having jagged edges with flattened geometric polyhedron shapes. This specific combination prevents separation of phases over time.

Figure 2:
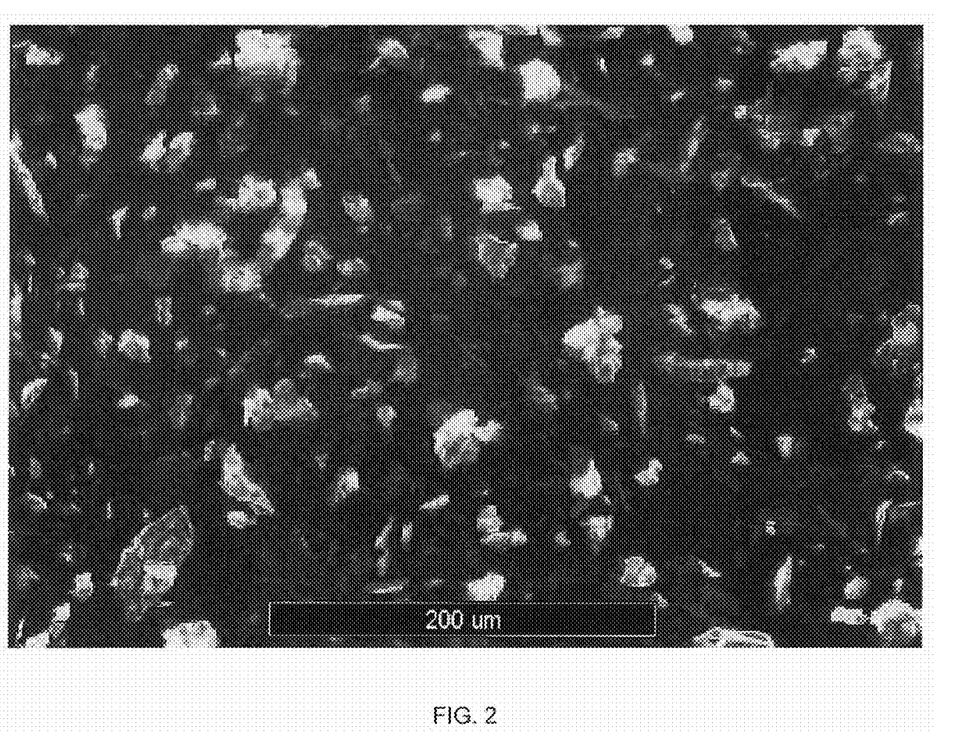
FIG. 2 is a SEM photograph of naturally-occurring mica fillers.
Figure 3:
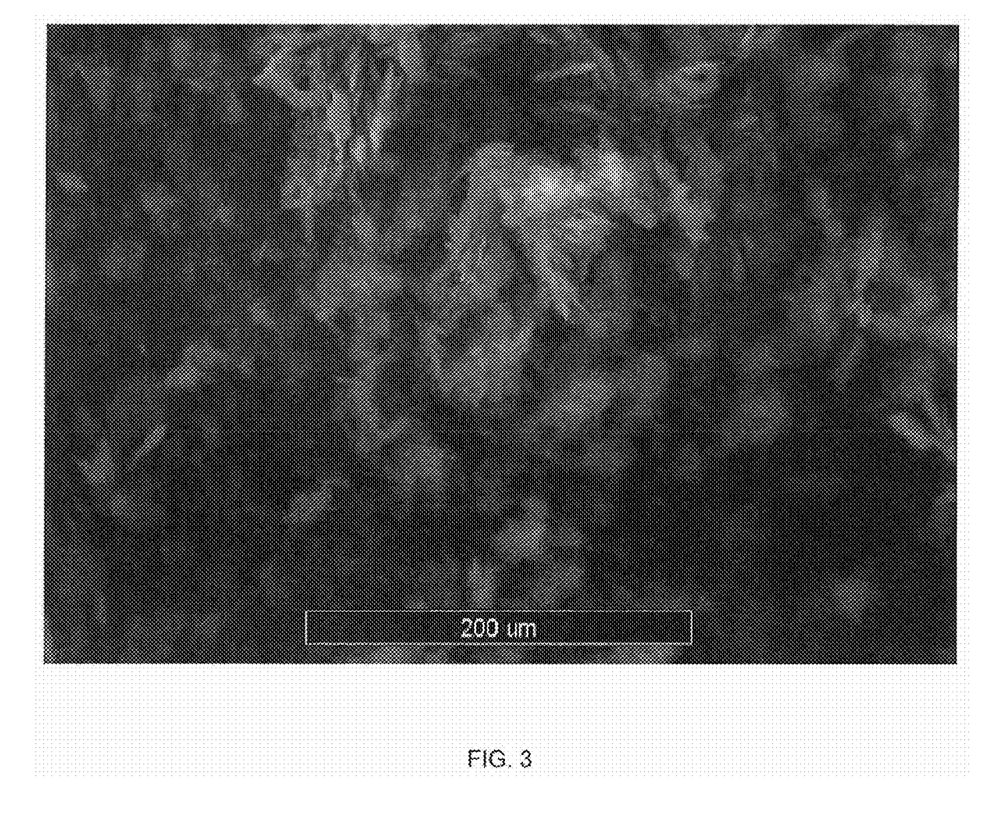
FIG. 3 is a SEM photograph of synthetic mica fillers.

Synthetic mica fillers, having jagged edges with flattened geometric polyhedron shapes, are included in the inventive anaerobic paste compositions, as shown in FIG. 2. Synthetic mica fillers have an entirely different structure than naturally-occurring mica fillers. Naturally-occurring mica fillers have a non-flat, geometric drusy shape, as shown in FIG. 3.

Other rheology modifiers include thickeners and fillers. Other suitable rheology modifiers include propoxylated bisphenol-A fumarate, bisphenol-A fumarate polyester resin, and fumed silica. In addition, suitable rheology modifiers include graphite, calcium oxide, calcium carbonate, calcium fluoride, calcium stearate, magnesium oxide, magnesium carbonate, magnesium fluoride, magnesium stearate, boron nitride, polyethylene, polypropylene, polytetrafluoroethylene, organophosphate, and combinations thereof. A particularly desirable combination includes graphite, polytetrafluoroethylene and polyethylene.

Commercially available examples of rheology agents include those from TEFLON, tricresyl phosphate under the tradename LINDOI by Akzo Nobel, Superior Graphite under the trade designation Graphite 5539 (particle size: 90% minimum, 20 micron, Ash: 02%, max); Mississippi Lime under the tradename QUICK LIME (fine white powder, particle size 325 mesh or lower); Pluss Staufer under the tradename ATOMFOR S (particle size: 99% smaller than 325 mesh, specific gravity: 2.71); Seaforth Mineral under the tradename FLUORSPAR SUPERFINE (specific gravity: 3.81, solubility in water: 16 mg/l); Witco, under the trade designation name Calcium Stearate Regular (white powder, slightly fatty odor, melting point: 106° C., specific gravity: 1.03); Kyowa Chemical under the tradename PYROKISMA 530 IJ (white powder, MgO: 93.8, heat loss: 0.930); Dolomita Ltd under the tradename DOLOMITA #325 TB (particle size 325 mesh); Spectrum Chemical as magnesium fluoride (particle size: 325 mesh); CP Hall as magnesium stearate (white powder, specific gravity: 1.028, particle size: 325 mesh); Advanced Ceramics under the trade designation Boron Nitride HCP GRADE (particle size: 7-10 micron, 99% passes through 325 mesh, density: 0.4 g/cc, moisture: 0.15%); Equistar Chem under the tradename MICROTHENE FN-510 (fine powder, particle size: 15% max, retained 270 mesh); Eastman Chemical under the tradename POLENE N-15 WAX (white solids, specific gravity: 0.62); and DuPont under the tradename ZONYL MP 1300 (specific gravity: 2.1-2.3). Also, useful lubricious agents include petroleum distillates, 1-10% Chemplex FP-1 and Severely Hydrotreated Heavy Naphthenic D (Mineral Oil) 1-10% Hygold H100.

Total rheology modifier component should comprise from about 20 to about 90 percent by weight of the composition, such as about 25 to about 60 percent by weight, based on the total weight of the composition.

The anaerobic paste composition may further comprise additives. Useful additives include antioxidants, colorants, stabilizers, and additional polymers.

The paste compositions of the present invention may be prepared using any conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys. The compositions of this invention demonstrate particularly good bond strength on steel, brass, bronze, copper and iron. An appropriate primer may be applied to a surface of the chosen substrate to enhance cure rate.

In addition, this invention provides a method of preparing an anaerobic paste composition, a step of which includes mixing together a (meth)acrylate component, plasticizer, rheology modifying agents and cure agents.

The invention also provides a process for preparing a reaction product from the anaerobic paste composition of the present invention, the steps of which include applying the composition to a desired substrate surface and exposing the composition to an anaerobic environment for a time sufficient to cure the composition. The paste compositions are useful as anaerobic tubular thread sealant compositions.

Once cured, the anaerobic paste with synthetic mica fillers and cetyl alcohol provides improved cure speed and superior adhesion on both steel and stainless-steel substrates over an anaerobic paste made with naturally-occurring mica fillers.

The cure speed remains predictable, fast and same throughout the inventive composition since the paste does not separate even under temperature fluctuations. Additionally, the synthetic mica fillers have higher purity and less metal containments than naturally-occurring mica, and this prevents premature cure profile of the anaerobic paste composition.

Articles of manufacture encompassed by the invention include fasteners and joints, both threaded and non-threaded surfaces, and particularly for threaded surfaces. Examples include, bolts, nuts, screws, rods and studs.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

Examples 1. Anaerobic Sealant Formulations

TABLE 1

| Component | Compound | High Viscosity Sample 1 (wt %) | Low Viscosity Sample 2 (wt %) |
| --- | --- | --- | --- |
| Resin | Polyethylene glycol dimethacrylate | 22.525 | 11 |
| Plasticizer | Tetraethyleneglycol dioctanoate | 5 | 22.525 |
|  | Tricresylphosphate | 7 | 11 |

TABLE 1-continued

| Component | Compound | High Viscosity Sample 1 (wt %) | Low Viscosity Sample 2 (wt %) |
|---|---|---|---|
| Rheology modifier | Synthetic mica fillers | 10 | 10 |
| | Cetyl alcohol | 3 | 3 |
| | Propylated bisphenol A fumarate | 20 | 10 |
| | Graphite | 7 | 7 |
| | Polyethylene powder | 10 | 10 |
| | Teflon | 8 | 8 |
| Cure agents: initiator | Cumene hydroperoxide | 1 | 1 |
| accelerators | Saccharine | 2 | 2 |
| | N,N-diethyl-p-toluidine | 0.4 | 0.4 |
| stabilizer | N,N-dimethyl-p-toluidine | 0.075 | 0.075 |
| chelator | Naphthoquinone premix | 0.8 | 0.8 |
| | EDTA | 1.6 | 1.6 |
| Additives | Titanium dioxide | 1.6 | 1.6 |

Anaerobic Samples 1 and 2 were prepared by combining all of the components in in an Air Mixer with stainless steel Cowles/Sawblade impeller for 3 hours at room temperature. The mixed Samples were stored at 4° C. Sample 1 is high viscosity sealant and Sample 2 is low viscosity sealant.

Example 2. Cure Speed and Break Torque

Figure 7:
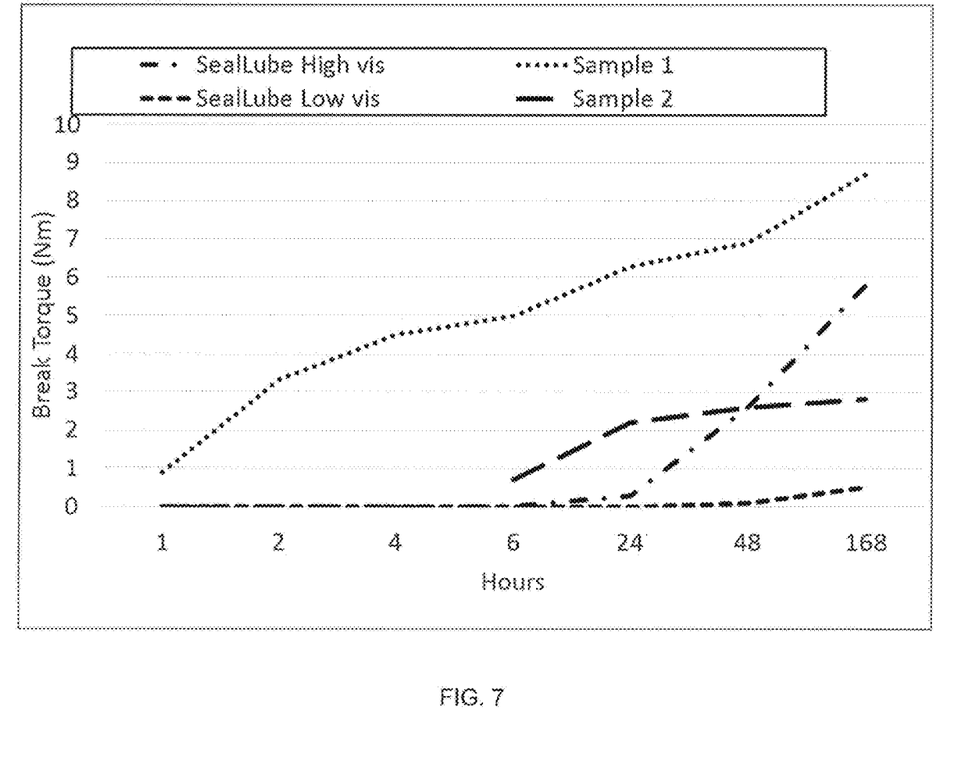
FIG. 7 is a plot of break torques of anaerobic samples against time on steel nuts and bolts.

The cure speed of the above samples was measured against break torque. Break torque was measured in accordance with ASTM D 5649, titled, "Torque Strength of Adhesives used on Threaded Fasteners." Break torque strength was tested on ⅜"×24" steel grade 2 nut and bolt assembly. For comparison, SEALLUBE (both high viscosity and low viscosity sealants), available from Henkel Corporation, was also measured and reported in Table 2 and FIG. 7. Samples 1 and 2 cure earlier and faster than SealLubes at both high and low viscosities on steel.

TABLE 2

| Break Torque at 22° C. | High Viscosity (Nm) | | Low Viscosity (Nm) | |
|---|---|---|---|---|
| (hour) | SEALLUBE | Sample 1 | SEALLUBE | Sample 2 |
| 1 | — | 0.9 | — | — |
| 2 | — | 3.3 | — | — |
| 4 | — | 4.5 | — | — |
| 6 | 0.02 | 5.0 | — | 0.7 |
| 24 | 0.3 | 6.3 | — | 2.2 |
| 48 | 2.6 | 6.9 | 0.1 | 2.6 |
| 168 | 5.8 | 8.7 | 0.5 | 2.8 |

Figure 8:
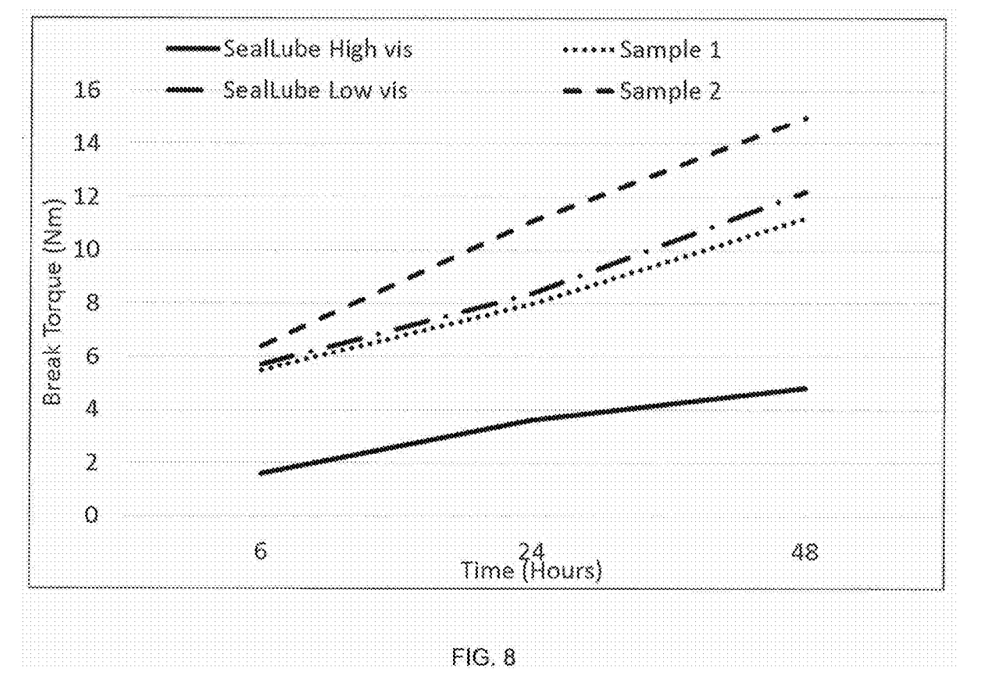
FIG. 8 is a plot of break torques of anaerobic samples against time on stainless steel nuts and bolts.

Break torques on passive metal substrates were also tested on ⅜"×16" stainless steel nuts and bolts, and the results are shown in Table 3 and FIG. 8. Samples 1 and 2 cure earlier and faster than SEALLUBES at both high and low viscosities on stainless steel.

TABLE 3

| Break Torque at 22° C. | High Viscosity (Nm) | | Low Viscosity (Nm) | |
|---|---|---|---|---|
| (hour) | SEALLUBE | Sample 1 | SEALLUBE | Sample 2 |
| 6 | 1.6 | 3.9 | 0.2 | 0.7 |
| 24 | 3.6 | 4.4 | 0.4 | 2.7 |
| 48 | 4.8 | 6.4 | 1.0 | 2.8 |

The break torque for Samples 1 and 2 cured faster and developed higher strength than the conventional SEALLUBES at both high and low viscosities on all substrates. It should be noted that a torque of about 0.6 Nm is the limit of hand loosening.

Example 3. Phase Separation Analysis

Figure 1:
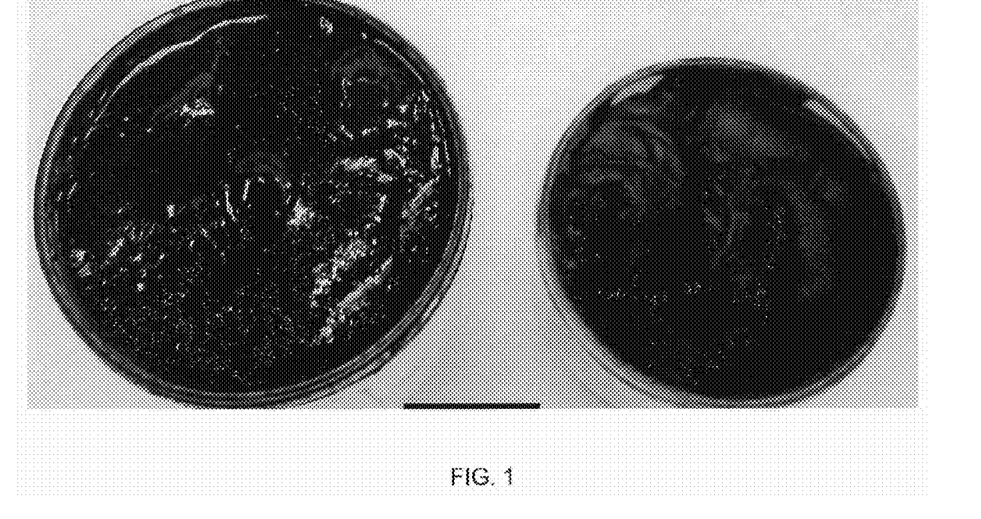
FIG. 1 is a photograph of two low-viscosity anaerobic paste compositions.

FIG. 1 is a photograph of two low-viscosity anaerobic pastes, after they were subjected to room temperature for over three weeks. Control Sample A paste, comprised of natural mica with cetyl alcohol, separated into clear pool of liquid on top of a dark paste. The clear pool was evaluated with IR and TD/GC/MS, and the results are shown in Table 4. Sample B paste in FIG. 1 is has the same components as Control Sample A but made with synthetic mica instead of natural mica.

TABLE 4

| IR | TD/GC/MS |
|---|---|
| Plasticizer | Plasticizer |
| Non-filler rheology modifiers | Non-filler rheology modifiers |
| | Curing agent (decomposed) |

The IR and TD/GC/MS showed that the separated liquid contained plasticizers, decomposed curing agents and non-filler rheology modifiers. Without being bound to any specific theory, phase separations of the paste contribute to inconsistent and delayed curing of the paste.

Sample 2, a low-viscosity anaerobic paste composition, in FIG. 1 did not separate over three weeks and maintained a single phase.

Example 4. Aging and Phase Separation

Figure 4:
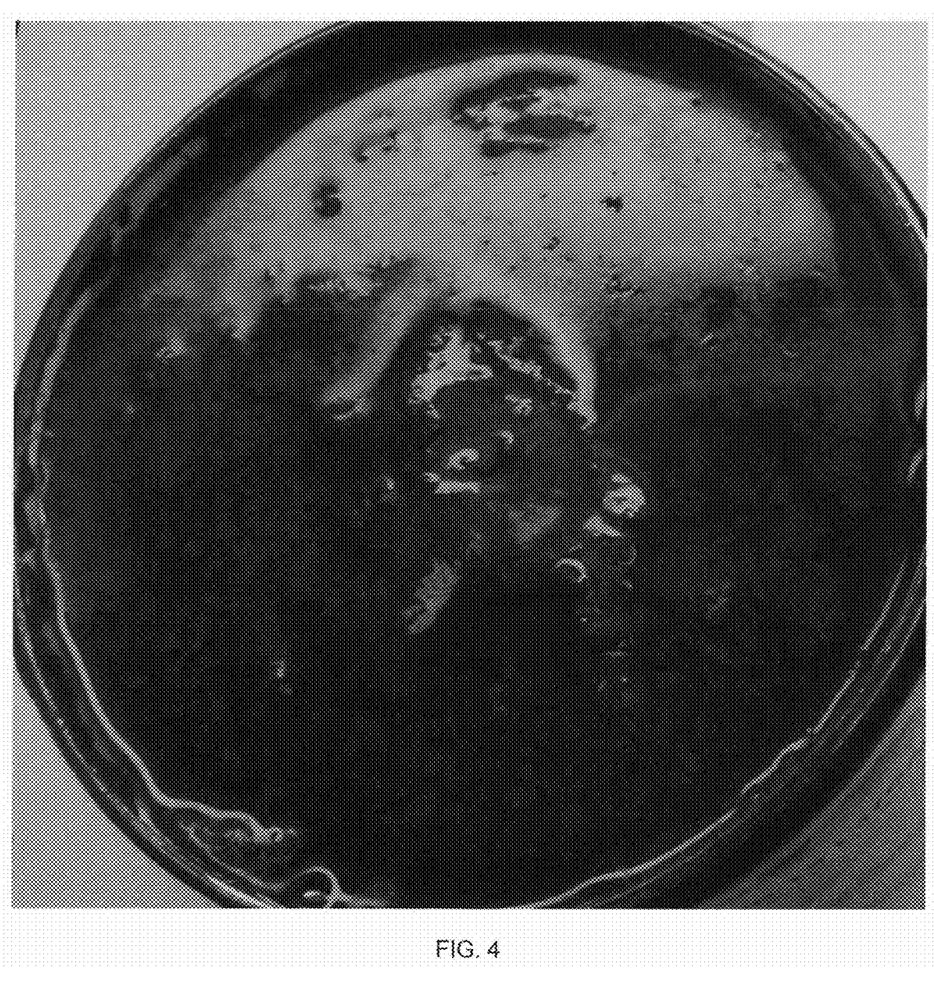
FIG. 4 is a photograph of a high-viscosity anaerobic paste made with natural mica fillers and cetyl alcohol after aging for 11 months.

FIG. 4 is a photograph of Control Sample A, which is substantially the same as Sample 1 but contained about 11.2 wt % of natural mica fillers and cetyl alcohol, after aging for 11 months. This anaerobic paste phase separate over time.

Figure 5:
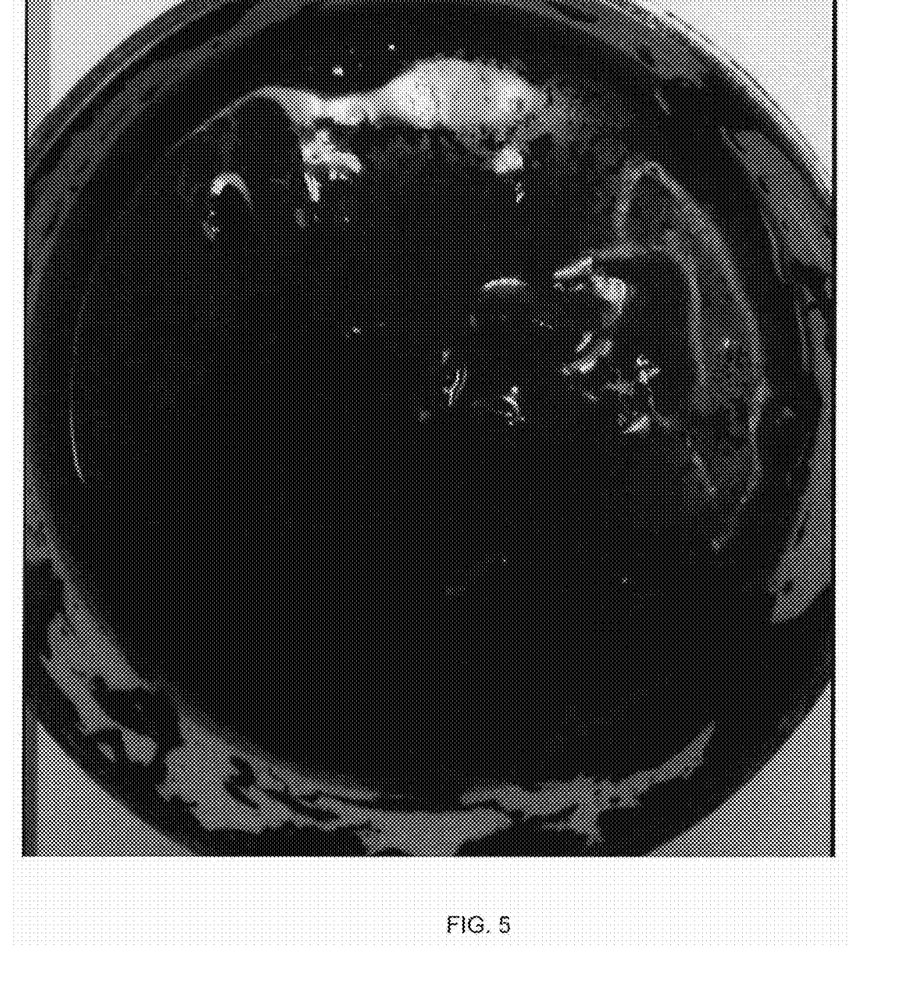
FIG. 5 is a photograph of a high-viscosity anaerobic paste made with synthetic mica fillers without cetyl alcohol after aging for 11 months.

A photograph of an Control Sample 1, high viscosity paste with synthetic mica and without any cetyl alcohol, after aging for 11 months, is shown in FIG. 5. Anaerobic paste without the cetyl alcohol phase separates.

Figure 6:
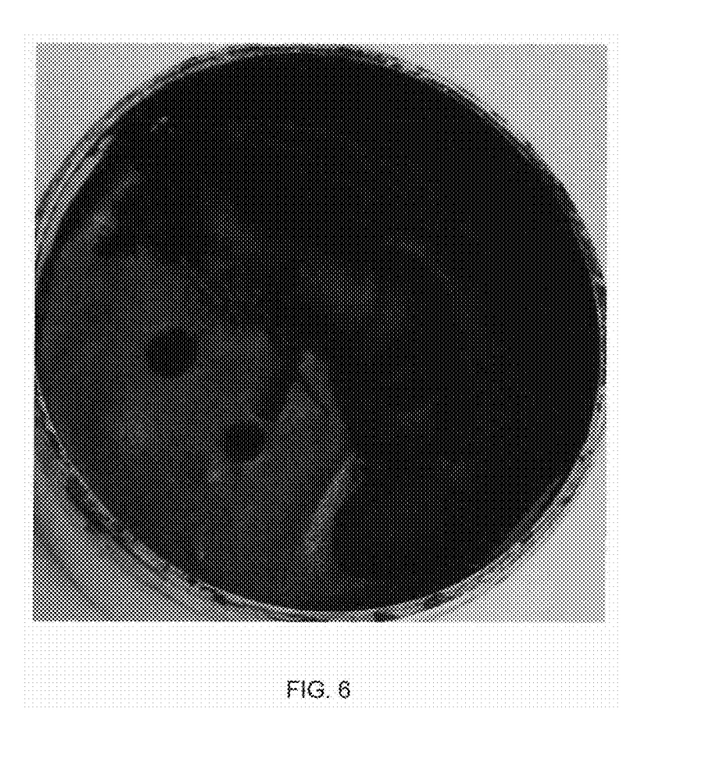
FIG. 6 is a photograph of Sample 1 after 7 aging for months.

FIG. 6 is a photograph of Sample 1 after 7 aging for months and is expected to maintain a single phase even after 11 months. The combination of both cetyl alcohol and synthetic mica fillers maintains a homogeneous paste after aging.

Example 5. Viscosity

Viscosity of Sample 1 and Control was tested after equilibrating for 24 hours at the listed temperature in Table 5. Both samples in Table 5 contained the same components except that Sample 1 contained about 10 wt % of synthetic mica fillers and cetyl alcohol and Control Sample A contained about 11.2 wt % of natural mica fillers and cetyl alcohol. Viscosity was measured with Brookfield with Helipath Instrument HBT at 0.5 rpm with the specified T bar spindle in Table 5.

TABLE 5

| Temperature (° C.) | Brookfield spindle | Control A (cps) | Sample 1 (cps) |
|---|---|---|---|
| 4 | TD | 17,116,666 | 29,383,333 |
| 22 | TD | 4,826,666 | 10,262,833 |
| 25 | TD | 3,684,000 | 8,949,750 |
| 30 | TD | 278,000 | 1,605,000 |

TABLE 5-continued

| Temperature (° C.) | Brookfield spindle | Control A (cps) | Sample 1 (cps) |
|---|---|---|---|
| 35 | TA | 46,933 | 190,000 |
| 40 | TA | 37,333 | 219,167 |
| 45 | TA | 31,467 | 208,500 |
| 50C | TA | 32,533 | 207,500 |

Sample 1's viscosity remained far higher, about an order of magnitude higher at 30° C. or higher, than the Control Sample A. Even when smaller quantities of synthetic mica fillers (in combination with cetyl alcohol) are added to the Sample 1, the resulting viscosity is higher than the Control Sample A with higher quantities of naturally occurring mica fillers, throughout the entire temperature ranges of 4° C. to 50° C. Moreover, Sample 1 maintained a single phase over long period of time and provided a faster cure profile than Control Sample A.

Many modifications and variations of this invention can be made without departing from its spirit and scope, as will be apparent to those skilled in the art. The specific embodiments described herein are offered by way of examples only, and the invention is to be limited only by the terms of the appended claims, along with the full scope of equivalents to which such claims are entitled.

I claim:

1. An anaerobic paste composition comprising:
   a) an acrylate;
   b) a plasticizer;
   c) a curing agent; and
   d) a mixture of rheology modifiers of cetyl alcohol and a plurality of synthetic mica fillers having jagged edges with flattened geometric polyhedron shapes.

2. The anaerobic paste composition of claim 1, wherein the anaerobic paste composition is free of any naturally occurring mica fillers.

3. The anaerobic paste composition of claim 1, wherein the acrylate is difunctional (meth)acrylate.

4. The anaerobic paste composition of claim 3, wherein the difunctional (meth)acrylate is selected from the group consisting of polyethylene glycol di(meth)acrylates, di(meth)acrylates, diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycol diacrylate, tetramethylene dimethacrylate, ethylene dimethacrylate, neopentyl glycol diacrylate, bisphenol-A mono and di(meth)acrylates, and mixtures thereof.

5. The anaerobic paste composition of claim 4, wherein the difunctional (meth)acrylate is polyethylene glycol di(meth)acrylates.

6. The anaerobic paste composition of claim 1, wherein the plasticizer is selected from the group consisting of trimelliates, maleates, organophosphates, glycol, polyether, and mixtures thereof.

7. The anaerobic paste composition of claim 1, wherein the plasticizer is tetraethylene glycol dioctanoate.

8. The anaerobic paste composition of claim 1, wherein the curing agent is a free radical initiator, free radical co-accelerator, an inhibitor, a free radical stabilizer or a chelator.

9. The anaerobic paste composition of claim 1, wherein the rheology modifier further comprises propoxylated bisphenol-A fumarate, bisphenol-A fumarate polyester resin or fumed silica.

10. The anaerobic paste composition of claim 1 further comprising an additive selected from the group consisting of antioxidants, colorant, stabilizers, and mixtures thereof.

11. The anaerobic paste composition of claim 1 comprising:
    a) about 15 to about 35 wt % of the acrylate;
    b) about 1 to about 10 wt % of the plasticizer;
    c) about 0.2 to about 20 wt % of the curing agent; and
    d) about 20 to about 90 wt % of the mixture of rheology modifier.

12. An article of manufacture comprising the anaerobic paste composition of claim 1.

13. The article of claim 12, wherein the article comprises a tubular thread.

14. The article of claim 12, wherein the article comprises a fastener selected from the group consisting of nuts, bolts, rods, pins, collars, studs, pipes and anchors.

* * * * *